(12) United States Patent
Wang et al.

(10) Patent No.: US 11,994,492 B2
(45) Date of Patent: May 28, 2024

(54) GAS ANALYSIS DEVICE AND METHOD FOR DETECTING SAMPLE GAS

(71) Applicant: Nuctech Company Limited, Beijing (CN)

(72) Inventors: Yan Wang, Beijing (CN); Qingjun Zhang, Beijing (CN); Yuanjing Li, Beijing (CN); Zhiqiang Chen, Beijing (CN); Jianmin Li, Beijing (CN); Yaohong Liu, Beijing (CN); Ge Li, Beijing (CN); Zhongyuan Hao, Beijing (CN); Nei Yang, Beijing (CN); Guangqin Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 39 days.

(21) Appl. No.: 17/806,805

(22) Filed: Jun. 14, 2022

(65) Prior Publication Data

US 2022/0404312 A1    Dec. 22, 2022

(30) Foreign Application Priority Data

Jun. 17, 2021  (CN) .......................... 202110674647.2

(51) Int. Cl.
*H01J 49/42*       (2006.01)
*G01N 27/623*      (2021.01)
*H01J 49/00*       (2006.01)
*H01J 49/06*       (2006.01)

(52) U.S. Cl.
CPC ........ *G01N 27/623* (2021.01); *H01J 49/0031* (2013.01); *H01J 49/061* (2013.01); *H01J 49/424* (2013.01); *H01J 49/4265* (2013.01)

(58) Field of Classification Search
CPC .... H01J 49/004; H01J 49/0031; H01J 49/061; H01J 49/067; H01J 49/424; H01J 49/0481; H01J 49/4265; G01N 27/623
See application file for complete search history.

(56) References Cited

U.S. PATENT DOCUMENTS

2012/0326023 A1* 12/2012 Kozole ................ G01N 27/623
                                                                250/288

\* cited by examiner

*Primary Examiner* — David E Smith
*Assistant Examiner* — Hsien C Tsai
(74) *Attorney, Agent, or Firm* — Schwegman Lundberg & Woessner, P.A.

(57) ABSTRACT

The present disclosure provides a gas analysis device and a method for detecting sample gas. The gas analysis device includes: an ion mobility spectrometer including an ion mobility tube, an ion gate, a plurality of electrodes, a suppression grid, and a Faraday plate sequentially disposed in the ion mobility tube, wherein the Faraday plate is configured to receive sample ions discharged from the suppression grid, and the Faraday plate is provided with a through hole; a mass spectrometer; a gate valve disposed between the Faraday plate and an ion inlet of the mass spectrometer; and a controller configured to control an opening or closing of the gate valve to allow the sample ions discharged from the suppression grid to flow into the mass spectrometer through the through hole of the Faraday plate when the gate valve is opened.

19 Claims, 6 Drawing Sheets

GAS ANALYSIS DEVICE AND METHOD FOR DETECTING SAMPLE GAS

CROSS REFERENCE

This application claims the benefit of Chinese Patent Application No. 202110674647.2 filed on Jun. 17, 2021 in the State Intellectual Property Office of China, the whole disclosure of which is incorporated herein by reference.

TECHNICAL FIELD

Embodiments of the present disclosure relate to a gas analysis device, and in particular to a gas analysis device for detecting gas in a variety of ways and a method for detecting sample gas.

BACKGROUND

At present, a gas analysis device based on a cluster gas chromatography tandem ion mobility spectrometry technology may substantially meet a customs passenger inspection and rapid non unpacking inspection of animals, plants and food in a cargo inspection channel. In this gas analysis device, through a primary separation of chromatography and a secondary separation of an ion mobility system, two-dimensional data consisting of retention time and mobility time may be obtained for an object to be inspected. Since polarities and collision cross-sectional areas of ions of different substances are different, a good distinction may be obtained.

However, a time-of-flight mass analyzer with an extremely fast scanning speed is used in the gas analysis device described above. The mass analyzer is bulky and has a complicated control system. Although an acquisition of all mass spectrum data may be completed in a single scanning of the ion mobility system, it cannot be miniaturized due to its volume and a complexity of the control system. Furthermore, a detection speed of a miniaturized mass spectrometer is slow, which may not be completely synchronized with an ion mobility spectrum analysis, thus a complete ion mobility spectrum—mass spectrum spectrogram may not be obtained.

SUMMARY

An object of the present disclosure is to solve at least one aspect of the problems and disadvantages described above existing in the prior art.

According to an embodiment of an aspect of the present disclosure, a gas analysis device is provided, including: an ion mobility spectrometer including an ion mobility tube, an ion gate, a plurality of electrodes, a suppression grid, and a Faraday plate sequentially disposed in the ion mobility tube, wherein the Faraday plate is configured to receive sample ions discharged from the suppression grid, and the Faraday plate is provided with a through hole; a mass spectrometer; a gate valve disposed between the Faraday plate and an ion inlet of the mass spectrometer; and a controller configured to control an opening or closing of the gate valve to allow the sample ions discharged from the suppression grid to flow into the mass spectrometer through the through hole of the Faraday plate when the gate valve is opened.

According to an embodiment of the present disclosure, the controller is further configured to control voltages applied to the ion gate, the electrodes and the suppression grid and an activation of the mass spectrometer to control an operating mode of the ion mobility spectrometer.

According to an embodiment of the present disclosure, the controller is configured to control the ion gate to be opened or closed alternately, and control the voltages applied to the electrodes and the suppression grid such that the sample ions move from the ion gate to the Faraday plate through the suppression grid, and control the gate valve to be closed, such that the gas analysis device operates in an ion mobility spectrum detection mode.

According to an embodiment of the present disclosure, the controller is configured to control the ion gate and the suppression grid in a continuous open state and control the gate valve to be opened such that the sample ions move from the ion gate into the mass spectrometer through the through hole of the Faraday plate, such that the gas analysis device operates in a mass spectrum detection mode.

According to an embodiment of the present disclosure, the controller is configured to control the ion gate to be opened or closed alternately, control the voltages applied to the electrodes and the suppression grid such that the sample ions move from the ion gate to the Faraday plate through the suppression grid, and control the gate valve to be opened or closed alternately to allow the sample ions to enter the mass spectrometer through the through hole of the Faraday plate after acquiring a signal from the Faraday plate, such that the gas analysis device operates in a first mixed detection mode including an ion mobility spectrum detection mode and a mass spectrum detection mode.

According to an embodiment of the present disclosure, the controller is configured to control the ion gate to be opened or closed alternately, control the voltages applied to the electrodes and the suppression grid such that the sample ions move from the ion gate to the Faraday plate through the suppression grid, and control the suppression grid to be opened or closed alternately such that the suppression grid selectively releases a part of the sample ions into the mass spectrometer through the Faraday plate while acquiring a signal from the Faraday plate, such that the gas analysis device operates in a second mixed detection mode including an ion mobility spectrum detection mode and a mass spectrum detection mode.

According to an embodiment of the present disclosure, the controller is configured to control the ion gate to be opened or closed alternately, control the voltages applied to the electrodes and the suppression grid such that sample ions move from the ion gate to the Faraday plate through the suppression grid, and control the gate valve to be opened such that the sample ions enter the mass spectrometer through the through hole of the Faraday plate at a plurality of ion selection timings, such that the gas analysis device operates in a mass spectrometer enrichment detection mode detecting accumulated ions from a single sample.

According to an embodiment of the present disclosure, the gas analysis device further includes a signal acquisition device for obtaining a mobility spectrogram and a mass spectrogram according to the sample ions received by the Faraday plate and the sample ions entering the mass spectrometer.

According to an embodiment of the present disclosure, the ion mobility spectrometer further includes: an ion source configured to generate initially charged ions; a sample input port configured to deliver sample gas into the ion mobility tube; and an isolation mesh arranged between the ion source and the ion gate to form a charge exchange region between the ion source and the isolation mesh, and an ion enrichment chamber between the isolation mesh and the ion gate.

According to an embodiment of the present disclosure, the ion mobility tube is provided with a migration gas inlet downstream of the suppression grid, and a migration gas outlet upstream of the ion gate.

According to an embodiment of the present disclosure, each of the ion gate and the suppression grid includes a frame, and a metal mesh attached to the frame.

According to an embodiment of the present disclosure, the mass spectrometer includes: an ion convergence device configured to receive the sample ions from the Faraday plate; a vacuum chamber provided with an ion trap configured to receive the sample ions from the ion convergence device and an ion detector configured to generate a mass spectrum from the ions collected in the ion trap; and a vacuum device configured to evacuate the vacuum chamber, such that the sample ions move to the ion trap.

According to an embodiment of the present disclosure, the mass spectrometer further includes: a pre-vacuum chamber disposed between the ion convergence device and the vacuum chamber; a transfer device disposed in the pre-vacuum chamber to transfer the sample ions in the ion convergence device into the ion trap; and a pre-vacuum device configured to evacuate the pre-vacuum chamber, such that the sample ions move from the ion convergence device to the transfer device.

According to an embodiment of the present disclosure, the mass spectrometer further includes a vacuum exhaust port configured to adjust an air pressure in the pre-vacuum chamber and the vacuum chamber.

According to an embodiment of another aspect of the present disclosure, a method for detecting sample gas using the gas analysis device described above is provided, including: inputting sample gas into the ion mobility spectrometer; controlling the gate valve to be opened or closed to allow the sample ions discharged from the suppression grid of the ion mobility spectrometer to flow into the mass spectrometer through the through hole of the Faraday plate when the gate valve is opened.

According to an embodiment of the present disclosure, voltages applied to the ion gate, the electrodes and the suppression grid of the ion mobility spectrometer are controlled to control an operating mode of the ion mobility spectrometer.

According to an embodiment of the present disclosure, steps of controlling the voltages applied to the ion gate, the electrodes and the suppression grid of the ion mobility spectrometer includes: controlling the ion gate to be opened or closed alternately; controlling the voltages applied to the electrodes and the suppression grid such that the sample ions move from the ion gate to the Faraday plate through the suppression grid; and controlling the gate valve to be closed, such that the gas analysis device operates in an ion mobility spectrum detection mode.

According to an embodiment of the present disclosure, steps of controlling the voltages applied to the ion gate, the electrodes and the suppression grid of the ion mobility spectrometer includes: controlling the ion gate and the suppression grid to be in a continuous open state; controlling the gate valve to be opened, such that the sample ions move from the ion gate into the mass spectrometer through the through hole of the Faraday plate, such that the gas analysis device operates in a mass spectrum detection mode.

According to an embodiment of the present disclosure, steps of controlling the voltages applied to the ion gate, the electrodes and the suppression grid of the ion mobility spectrometer includes: controlling the ion gate to be opened or closed alternately; controlling the voltages applied to the electrodes and the suppression grid such that the sample ions move from the ion gate to the Faraday plate through the suppression grid; and controlling the gate valve to be opened or closed alternately to allow the sample ions to enter the mass spectrometer through the through hole of the Faraday plate after acquiring a signal from the Faraday plate, such that the gas analysis device operates in a first mixed detection mode including an ion mobility spectrum detection mode and a mass spectrum detection mode.

According to an embodiment of the present disclosure, steps of controlling the voltages applied to the ion gate, the electrodes and the suppression grid of the ion mobility spectrometer includes: controlling the ion gate to be opened or closed alternately; controlling the voltages applied to the electrodes and the suppression grid such that the sample ions move from the ion gate to the Faraday plate through the suppression grid; and controlling the suppression grid to be opened or closed alternately to allow the suppression grid to selectively release a part of the sample ions into the mass spectrometer through the Faraday plate while acquiring a signal from the Faraday plate, such that the gas analysis device operates in a second mixed detection mode including an ion mobility spectrum detection mode and a mass spectrum detection mode.

According to an embodiment of the present disclosure, steps of controlling the voltages applied to the ion gate, the electrodes and the suppression grid of the ion mobility spectrometer includes: controlling the ion gate to be opened or closed alternately; controlling the voltages applied to the electrodes and the suppression grid such that the sample ions move from the ion gate to the Faraday plate through the suppression grid; and controlling the gate valve to be opened such that the sample ions enter the mass spectrometer through the Faraday plate at a plurality of ion selection timings, and the gas analysis device operates in a mass spectrometer enrichment detection mode detecting accumulated ions from a single sample.

DETAILED DESCRIPTION OF EMBODIMENTS

Technical solutions in the embodiments of the present disclosure will be described clearly and completely with reference to the accompanying drawings in the embodiments of the present disclosure. It is obvious that the embodiments described are only a part of the embodiments of the present disclosure, rather than all the embodiments. The following descriptions of at least one exemplary embodiment are merely illustrative in fact, and are in no way intended to limit the present disclosure, its application or use. All other embodiments obtained by those of ordinary skill in the art based on the embodiments in the present disclosure without creative work belong to the protection scope of the present disclosure.

In the following detailed descriptions, for ease of explanation, numerous specific details are set forth in order to provide a thorough understanding of the embodiments of the present disclosure. However, it is obvious that one or more embodiments may be implemented without these specific details. In other instances, well-known structures and devices are shown in diagram forms to simplify the drawings. Techniques, methods, and apparatus known to those of ordinary skill in the relevant art may not be discussed in detail but should be regarded as a part of the description where appropriate.

In the descriptions of the present disclosure, it should be understood that the use of terms such as "first", "second", and the like to define components is only for ease of distinguishing corresponding components. The terms described above do not have special meanings unless otherwise stated, and therefore, they should not be construed as limiting the protection scope of the present disclosure.

According to a general inventive concept of the present disclosure, there is provided a gas analysis device, including: an ion mobility spectrometer including an ion mobility tube, and an ion gate, a plurality of electrodes, a suppression grid, and a Faraday plate sequentially disposed in the ion mobility tube, the Faraday plate is adapted to receive sample ions discharged from the suppression grid, and the Faraday plate is provided with a through hole; a mass spectrometer; a gate valve disposed between the Faraday plate and an ion inlet of the mass spectrometer; and a controller adapted to control an opening or closing of the gate valve to allow the sample ions discharged from the suppression grid to flow into the mass spectrometer through the through hole of the Faraday plate when the gate valve is opened.

According to another general inventive concept of the present disclosure, there is provided a method for detecting sample gas by using the gas analysis device described above, including: a sample gas is input into an ion mobility spectrometer; an opening or closing of a gate valve and an opening or closing of a suppression grid are controlled to allow sample ions discharged from the suppression grid of the ion mobility spectrometer to flow into the mass spectrometer through a through hole of a Faraday plate when the gate valve and the suppression grid are opened simultaneously.

According to an embodiment of the present disclosure, there is provided a gas analysis device suitable for detecting dangerous substances such as toxic and harmful gases, fumigants, high-flammable gases, trace drugs, and explosives in places such as public security, judiciary, prison, customs, border inspection, anti-smuggling and anti-drug, airports, important government agencies, important security agencies, military bases, consulates, residences of important persons, important conference venues, and the like.

Figure 1:
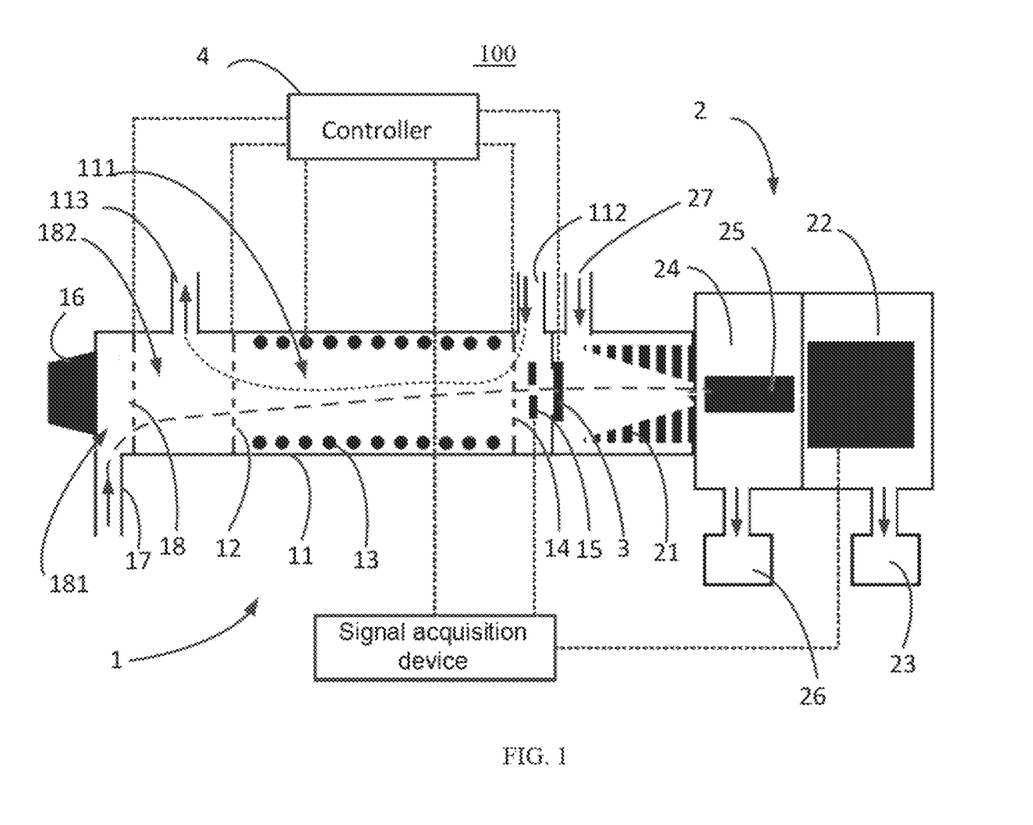
FIG. 1 shows a schematic diagram of a gas analysis device according to an exemplary embodiment.

FIG. 1 shows a schematic diagram of a gas analysis device according to an exemplary embodiment.

As shown in FIG. 1, in an embodiment, a gas analysis device 100 includes an ion mobility spectrometer (IMS) 1, a mass spectrometer 2, a gate valve 3 and a controller 4. The ion mobility spectrometer 1 includes an ion mobility tube 11, and an ion gate 12, a plurality of electrodes 13, a suppression grid 14 and a Faraday plate 15 sequentially disposed in the ion mobility tube, and the Faraday plate is adapted to receive sample ions discharged from the suppression grid 14.

Figure 2:
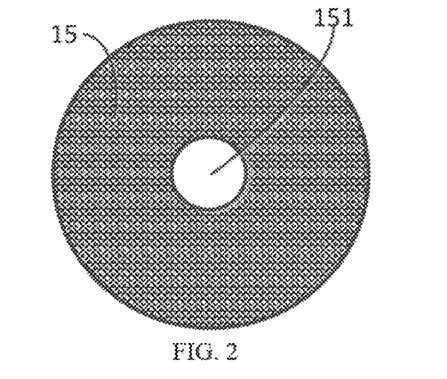
FIG. 2 shows a schematic diagram of a Faraday plate according to an exemplary embodiment of the present disclosure.
Figure 3:
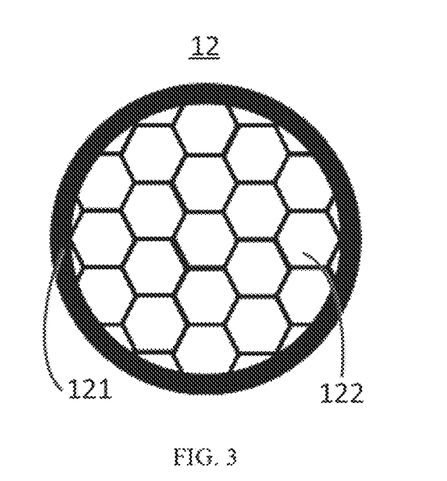
FIG. 3 shows a schematic diagram of an ion gate according to an exemplary embodiment of the present disclosure.
Figure 4:
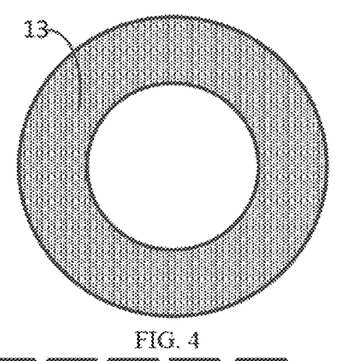
FIG. 4 shows a schematic diagram of an electrode according to an exemplary embodiment of the present disclosure.

FIG. 2 shows a schematic diagram of a Faraday plate according to an exemplary embodiment of the present disclosure. FIG. 3 shows a schematic diagram of an ion gate according to an exemplary embodiment of the present disclosure. FIG. 4 shows a schematic diagram of an electrode according to an exemplary embodiment of the present disclosure.

In an exemplary embodiment, as shown in FIG. 2, the Faraday plate 15 is provided with a through hole 151 to allow a part of the sample ions discharged from the suppression grid 14 to pass through the through hole 151. As shown in FIG. 3, each of the ion gate 12 and the suppression grid 14 includes a frame 121 and a metal mesh 122 attached to the frame. As shown in FIG. 4, each electrode 13 is arranged in a circular shape. The plurality of electrodes 13 and the suppression grid 14 form an electric field gradient within the mobility tube 11 so as to move charged sample ions within a mobility chamber 111 of the mobility tube 11. It may be understood that by changing a potential difference between the electrode 13 and the suppression grid 14, a migration speed of the sample ions in the mobility tube 11 may be changed.

In an exemplary embodiment, referring to FIG. 1, the ion mobility spectrometer 1 further includes: an ion source 16 adapted to generate initially charged ions; a sample input port 17 for delivering sample gas to be detected into the ion mobility tube 11; and an isolation mesh 18, such as a honeycomb gold-plated steel mesh, arranged between the ion source 16 and the ion gate 12. A charge exchange region 181 is formed between the ion source 16 and the isolation mesh 18, and the sample gas input from the sample input port 17 and the charged ions generated by the ion source 16 perform charge exchange in the charge exchange region 181, such that the sample gas is ionized to generate sample ions. An ion enrichment chamber 182 is formed between the isolation mesh and the ion gate. An electric field is formed between the isolation mesh 18 and the ion gate 12, and gaseous sample ions may freely diffuse from the charge exchange region 181 to the ion enrichment chamber 182, and the sample ions may be enriched or temporarily stored in the ion enrichment chamber 182.

In an exemplary embodiment, referring to FIG. 1, the ion mobility tube 11 is provided with a migration gas inlet 112 downstream of the suppression grid 14, and a migration gas outlet 113 upstream of the ion gate 12. There is a pressure difference between the migration gas outlet 113 and the migration gas inlet 112 to form a migration gas flow in the mobility tube 11.

In an exemplary embodiment, referring to FIG. 1, the mass spectrometer 2 includes an ion convergence device 21, a vacuum chamber 22, and a vacuum device 23. The ion convergence device 21 is adapted to receive the sample ions from the Faraday plate 15. The vacuum chamber 22 is provided with an ion trap adapted to receive the sample ions from the ion convergence device 21 and an ion detector for generating a mass spectrum from the ions collected in the ion trap. The vacuum device 23 is adapted to evacuate the vacuum chamber, such that the sample ions move to the ion trap.

In an exemplary embodiment, the mass spectrometer 2 further includes: a pre-vacuum chamber 24, a transfer device 25, and a pre-vacuum device 26. The pre-vacuum chamber 24 is disposed between the ion convergence device 21 and the vacuum chamber 22. The transfer device 25 is disposed in the pre-vacuum chamber 24 to transfer the sample ions in the ion convergence device into the ion trap. The pre-vacuum device 26 is adapted to evacuate the pre-vacuum chamber 25, such that the sample ions move from the ion convergence device 21 to the transfer device 25. For example, the pre-vacuum device 26 includes a mechanical pump.

In an exemplary embodiment, the mass spectrometer 2 also includes a vacuum exhaust port 27 suitable for regulating an air pressure in the pre-vacuum chamber 26 and the vacuum chamber 22. For example, the vacuum exhaust port 27 may be connected to a turbo pump, and an operation of the turbo pump may generate a vacuum in the pre-vacuum chamber 26 and the vacuum chamber 22 that is suitable for mass analysis.

In an exemplary embodiment, referring to FIG. 1, the gas analysis device 100 further includes a signal acquisition device for obtaining a mobility spectrogram and a mass spectrogram according to the sample ions received by the Faraday plate 15 and the sample ions entering the mass spectrometer 2.

In an exemplary embodiment, as shown in FIGS. 1-4, the gate valve 3 is disposed between the Faraday plate 15 and an ion inlet of the mass spectrometer 2. The controller 4 is adapted to control an opening or closing of the gate valve 3 to allow the sample ions discharged from the suppression grid 14 to flow into the mass spectrometer 2 through the through hole 151 of the Faraday plate 15 when the gate valve 3 is opened. The mass spectrometer 2 may detect the inflowing sample ions, and display a mass spectrum through the signal acquisition device.

In an exemplary embodiment, the controller 4 is further adapted to control voltages applied to the ion gate 12, the electrodes 13 and the suppression grid 14 and an activation of the mass spectrometer to control an operating mode of the ion mobility spectrometer 1.

Figure 5:
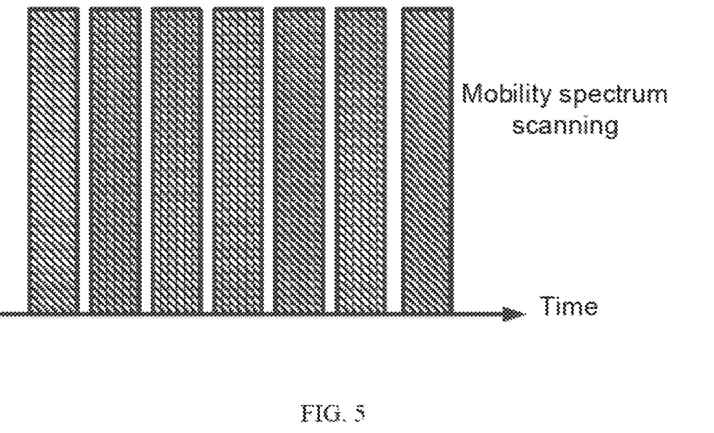
FIG. 5 shows a schematic timing diagram when a gas analysis device is used as an ion mobility spectrometer according to an exemplary embodiment of the present disclosure.

FIG. 5 shows a schematic timing diagram when a gas analysis device is used as an ion mobility spectrometer according to an exemplary embodiment of the present disclosure.

In an exemplary embodiment, referring to FIGS. 1 and 5, the controller 4 is adapted to control the ion gate 12 to be opened or closed alternately, and control the voltages applied to the electrodes 13 and the suppression grid 14 such that the sample ions move from the ion gate 12 to the Faraday plate 15 through the suppression grid 14. The Faraday plate 15 receives the sample ions and generates a signal, the mobility spectrogram is displayed on the signal acquisition device through a mobility spectrum scanning. During this process, the gate valve 3 is controlled to be closed, the sample ions may not reach the mass spectrometer 2, such that the gas analysis device 100 operates in an ion mobility spectrum detection mode. The ion mobility spectrum detection mode has a short analysis period, a high frequency, which may be adapted to a chromatographic post-column detection work.

Figure 6:
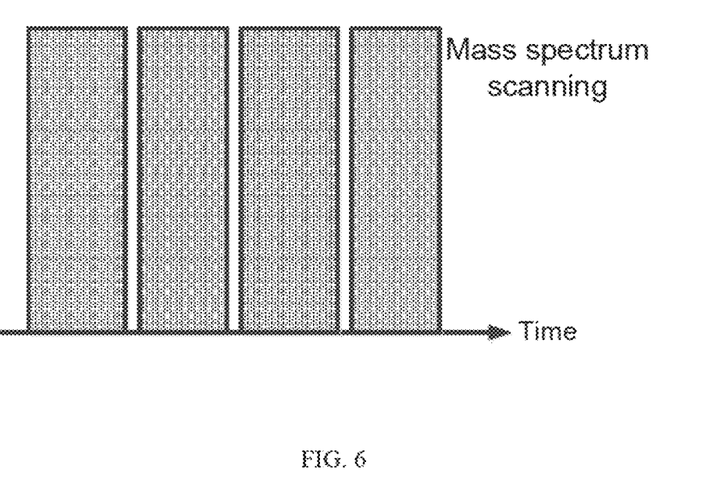
FIG. 6 shows a schematic timing diagram when a gas analysis device is used as a mass spectrometer according to an exemplary embodiment of the present disclosure.

FIG. 6 shows a schematic timing diagram when a gas analysis device is used as a mass spectrometer according to an exemplary embodiment of the present disclosure.

In an exemplary embodiment, referring to FIGS. 1 and 6, the controller 4 is adapted to control the ion gate 12 and the suppression grid 14 in a continuous open state and to control the gate valve 3 to be opened, such that the sample ions move from the ion gate 12 into the mass spectrometer 2 through the through hole 151 of the Faraday plate 15, thereby the gas analysis device may operate in a mass spectrum detection mode, and a series of spectrograms at different times are displayed on the signal acquisition device through a mass spectrum scanning, and a timing diagram of the series of spectrograms is shown in FIG. 6.

Figure 7:
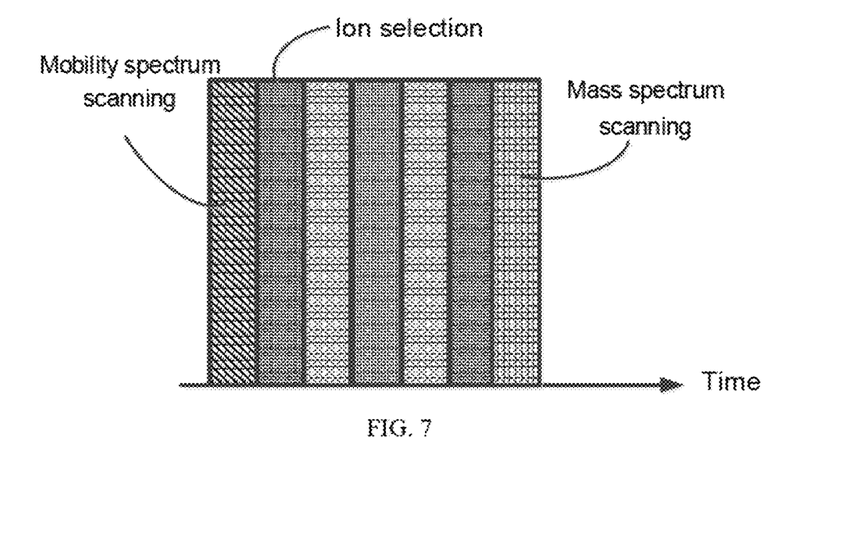
FIG. 7 shows a schematic diagram of a first mixed timing when a gas analysis device operates in a first mixed detection mode according to an exemplary embodiment of the present disclosure.

FIG. 7 shows a schematic diagram of a first mixed timing when a gas analysis device operates in a first mixed detection mode according to an exemplary embodiment of the present disclosure.

In an exemplary embodiment, referring to FIGS. 1 and 7, the controller 4 is adapted to control the ion gate 12 to be opened or closed alternately, and control the voltages applied to the electrodes 13 and the suppression grid 14 such that the sample ions move from the ion gate 12 to the Faraday plate 15 through the suppression grid 14 located downstream, so as to obtain an ion mobility signal from the Faraday plate 15; after that, the signal acquisition device is controlled to stop acquiring the signal from the Faraday plate, and the gate valve 3 is controlled to be opened or closed alternately to allow the sample ions to enter the mass spectrometer alternately through the through hole 151 of the Faraday plate 15 to obtain a plurality of mass spectrograms distributed at intervals on the signal acquisition device, such that the gas analysis device operates in a first mixed detection mode including the ion mobility spectrum detection mode and the mass spectrum detection mode. In the first mixed detection mode, the signal acquisition device outputs a mobility spectrogram, then alternately outputs a plurality of mass spectrograms at predetermined time intervals, and a supporting computer software performs subsequent data processing, which is equivalent to the ion mobility spectrometer and the mass spectrometer operating in series.

Specifically, referring to FIG. 7, under the control of the controller 4, the suppression grid 14 and the ion gate 12 are opened for a predetermined time, the gate valve 3 is closed, the Faraday plate 15 receives the sample ions and generates a signal, and the signal acquisition device obtains a mobility spectrogram from the Faraday plate; after that, the suppression grid 14 is closed, the Faraday plate 15 stops acquiring the sample ions to complete the acquisition of the mobility spectrogram; after that, the ion gate 12 continues to be opened for a predetermined time, and the gate valve 3 is opened, during this period, since the suppression grid 14 is still closed, the sample ions may not enter the mass spectrometer; after that, the controller controls the suppression grid 14 to be opened within a predetermined period of time to allow sample ions corresponding to a part of peak signals to enter the mass spectrometer, however, during the period when the sample ions enter the mass spectrometer, the mass spectrogram is still not displayed on the signal acquisition device, thus forming an ion selection timing prior to the mass spectrum timing shown in FIG. 7; after that, the sample ions completely enter the mass spectrometer under an action of the vacuum device 26, and a plurality of mass spectrograms distributed at intervals are obtained on the signal acquisition device. That is, before each mass spectrum timing is performed, there is an ion selection timing in which the sample ions move from the Faraday plate 15 to the mass spectrometer 2 under a condition that the gate valve 3 is opened under the control of the controller, which indicates that the sample ions move from the Faraday plate 15 to the ion detector of the mass spectrometer 2. In the first mixed detection mode, a pre-programmed software algorithm of the gas analysis device may be used to determine a mobility spectrum peak position (an opening time point of the suppression grid 14) and a peak width (an opening time period of the suppression grid 14) that need to be scanned by the mass spectrometer 2, or the suppression grid 14 is controlled via the controller 4 to be opened in subsequent multiple ion mobility scanning according to a pre-programmed mobility time and peak width. When scanning the mass spectrometer 2, the controller 4 opens the gate valve 3, and sucks the sample ions passing through the through hole 151 of the Faraday plate 15 into the ion convergence device 21 of the mass spectrometer 2. The sample ions are enriched via the ion convergence device 21, are then sucked into the vacuum chamber 22 for detection. In a subsequent detection of the ion mobility spectrometer, each mass spectrum scanning is accompanied by a mass spectrum scanning of a corresponding mobility spectrum peak position, and data is spliced through software to obtain a mobility spectrogram-mass spectrogram including one mobility spectrogram and a plurality of mass spectrograms. Since the whole gas analysis device 100 adopts continuous sample injection, and a possessive quantity of samples in an environment is large, each mobility spectrogram may be regarded as the same sample, and the first mobility spectrogram may be used to represent all the mobility spectrograms.

Figure 8:
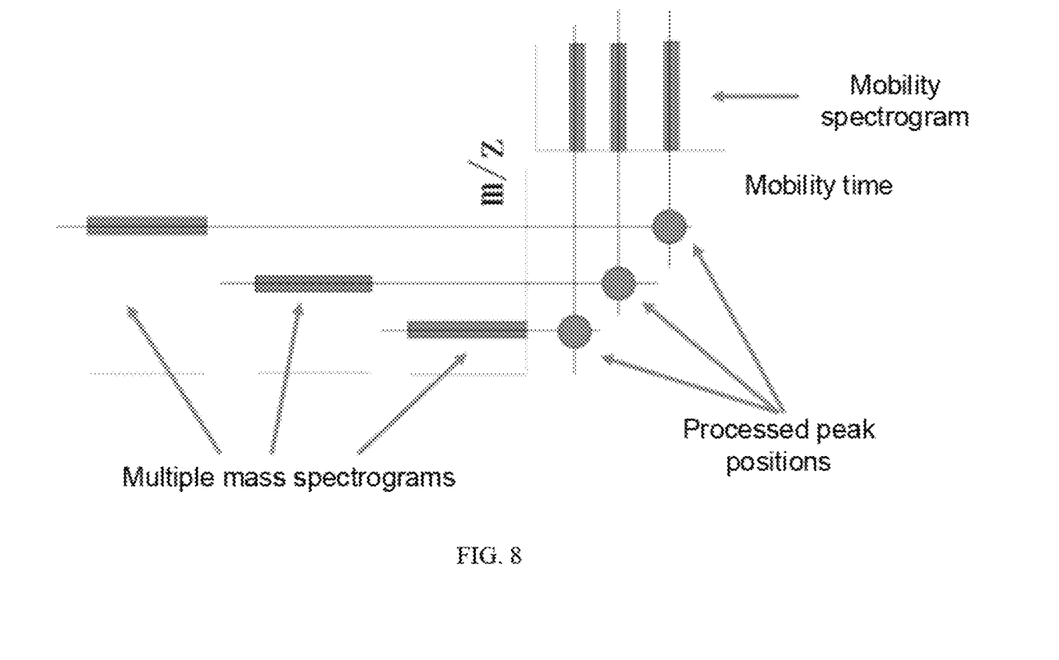
FIG. 8 shows a schematic diagram of a principle of orthogonally processing one mobility spectrogram and a plurality of mass spectrograms to obtain a synthetic spectrogram in a first mixed detection mode.

FIG. 8 shows a schematic diagram of a principle of orthogonally processing one mobility spectrogram and a plurality of mass spectrograms to obtain a synthetic spectrogram in the first mixed detection mode.

In an exemplary embodiment, referring to FIGS. 7 and 8, a signal of one mobility spectrum scanning and signals of a plurality of mass spectrum scanning are subjected to an orthogonal processing by a pre-programmed software algorithm of the gas analysis device, and signal intensities of a corresponding position may be orthogonally multiplied, a non-zero synthetic signal may be obtained only when the signal of the mobility spectrum scanning and the signal of the plurality of mass spectrum scanning are not 0, a synthetic peak may be marked only when the peak positions of the signal of the mobility spectrum scanning and the signal of the plurality of mass spectrum scanning occur simultaneously, and finally an orthogonal synthetic spectrogram in the first mixed detection mode may be obtained. Assuming that each substance has only one signal peak, three substances generate three signals represented by processed peak positions.

Figure 9:
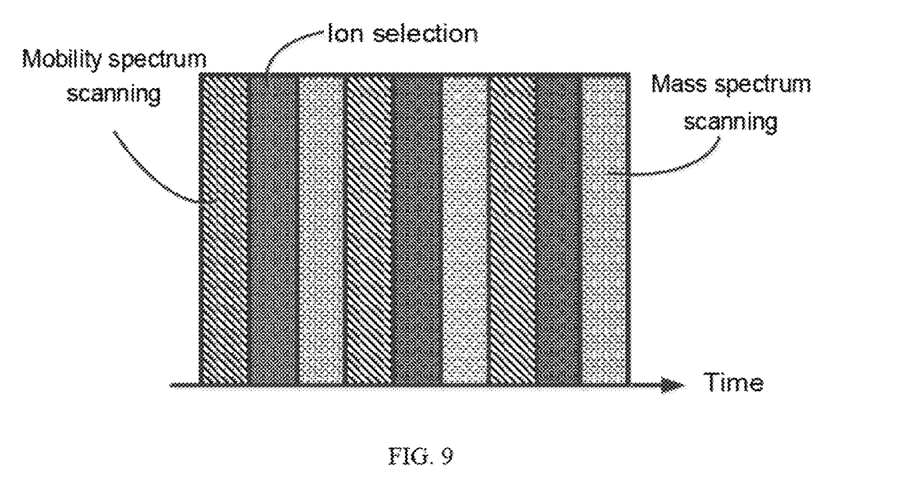
FIG. 9 shows a schematic diagram of a second mixed timing obtained when a gas analysis device operates in a second mixed detection mode according to an exemplary embodiment of the present disclosure.

FIG. 9 shows a schematic diagram of a second mixed timing obtained when a gas analysis device operates in a second mixed detection mode according to an exemplary embodiment of the present disclosure.

In an exemplary embodiment, referring to FIGS. 1 and 9, the controller 4 is adapted to control the ion gate 12 to be opened, and control the voltages applied to the electrodes 13 and the suppression grid 14 such that the sample ions move from the ion gate 12 to the Faraday plate 15 through the suppression grid 14 located downstream, control the gate valve 3 to be opened, and control the suppression grid to be opened or closed alternately, such that the suppression grid selectively releases a part of the sample ions from the ion gate, and the gate valve 3 selectively allows the sample ions having passed the suppression grid to enter the mass spectrometer 2 through the through hole 151 of the Faraday plate 15, thus the gas analysis device operates in a second mixed detection mode including the ion mobility spectrum detection mode and the mass spectrum detection mode. In the second mixed detection mode, the signal acquisition device keeps outputting a mobility spectrogram of the sample, while alternately outputting a mass spectrogram, and a supporting computer software performs subsequent data processing. In the second mixed detection mode, the signal acquisition device keeps outputting a mobility spectrogram, alternately outputting a plurality of mass spectrograms at predetermined time intervals simultaneously, and the supporting computer software performs subsequent data processing, which is equivalent to the ion mobility spectrometer and the mass spectrometer operating in parallel.

Specifically, referring to FIG. 9, under the control of the controller 4, the suppression grid 14 is opened, the ion gate 12 is opened for a predetermined time, the gate valve 3 is closed, the Faraday plate 15 receives the sample ions and generates a signal, and the signal acquisition device keeps acquiring the mobility spectrogram from the Faraday plate; after that, the ion gate 12 continues to be opened for a predetermined time, the gate valve 3 is opened and the suppression grid 14 is controlled to be opened or closed alternately, so as to allow the sample ions corresponding to a part of peak signals to enter the mass spectrometer, however, the mass spectrogram is still not displayed on the signal acquisition device during the period when the sample ions enter the mass spectrometer, thus forming an ion selection timing between the mobility spectrum sequence and the mass spectrum sequence as shown in FIG. 9; after that, the sample ions completely enter the mass spectrometer under an action of the vacuum device 26, and a plurality of mass spectrograms distributed at intervals are obtained on the signal acquisition device. That is, since the signal acquisition device keeps acquiring the mobility spectrogram from the Faraday plate, there is an ion selection timing in which the sample ions move from the Faraday plate 15 to the mass spectrometer 2 under a condition that the gate valve 3 is opened under the control of the controller prior to each mass spectrum timing, which indicates a time interval for the sample ions to move from the Faraday plate 15 to an ion detector of the mass spectrometer 2.

Figure 10:
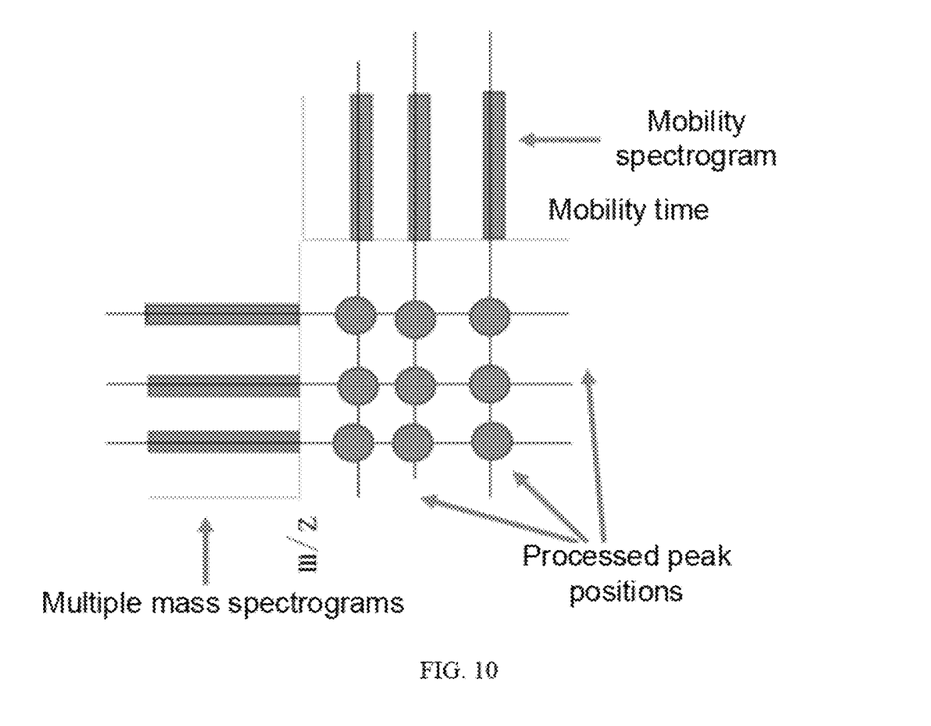
FIG. 10 shows a schematic diagram of a principle of orthogonally processing each corresponding mobility spectrogram and mass spectrogram at one time point to obtain a synthetic spectrogram in a second mixed detection mode.

FIG. 10 shows a schematic diagram of a principle of orthogonally processing each corresponding mobility spectrogram and mass spectrogram at one time point to obtain a synthetic spectrogram in the second mixed detection mode.

In an exemplary embodiment, referring to FIGS. 9 and 10, a signal of one mobility spectrum scanning and a signal of a plurality of mass spectrum scanning are subjected to an orthogonal processing by a pre-programmed software algorithm of the gas analysis device, and signal intensities of a corresponding position may be orthogonal multiplied, a non-zero synthetic signal may be obtained only when the signal of the mobility spectrum scanning and the signal of the plurality of mass spectrum scanning are not 0, a synthetic peak may be marked only when the peak positions of the signal of the mobility spectrum scanning and the signal of the plurality of mass spectrum scanning occur simultaneously, and finally three orthogonal synthetic spectrograms in the second mixed detection mode are obtained at three injection time points. Assuming that there are three substances, and each substance has only one signal peak, since the signal entering the mass spectrometer is not selected by the suppression grid, a plurality of peaks will be generated, then at each time point, after the orthogonal processing, the three substances generate nine signals represented by processed peak positions.

Figure 11:
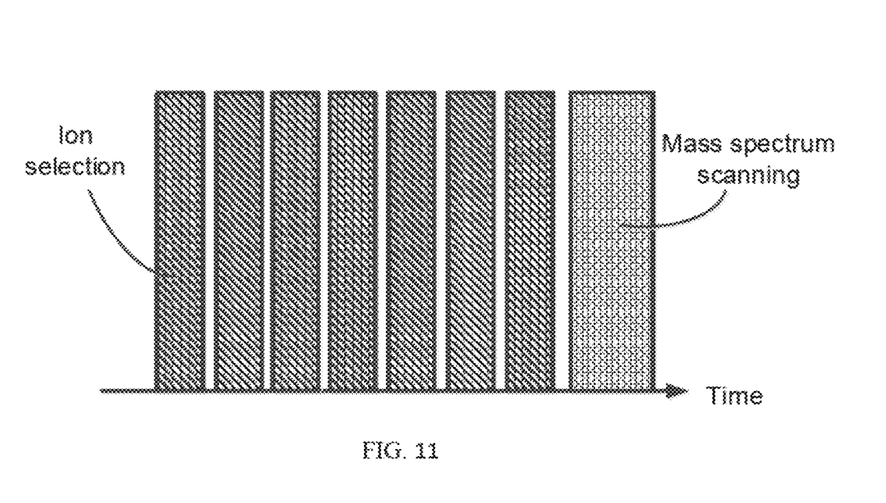
FIG. 11 shows a schematic diagram of an enrichment timing when a gas analysis device operates in a mass spectrometer accumulation detection mode according to an exemplary embodiment of the present disclosure.

FIG. 11 shows a schematic diagram of an enrichment timing when a gas analysis device operates in a mass spectrometer accumulation detection mode according to an exemplary embodiment of the present disclosure.

In an exemplary embodiment, referring to FIGS. 1 and 11, the controller 4 is adapted to control the ion gate 12 to be opened or closed alternately, control the voltages applied to the electrodes 13 and the suppression grid 14 such that the sample ions move from the ion gate 12 to the Faraday plate 15 through the suppression grid 14, and control the gate valve 3 to be opened or closed alternately, such that the gate valve 3 selectively allows the sample ions to enter the mass spectrometer 2 through the through hole 151 of the Faraday plate 15 at a plurality of ion selection timings, such that the gas analysis device 100 operates in a mass spectrometer enrichment detection mode that may detect accumulated ions from a single sample. Since a sample ion injection time of a single ion trap of the mass spectrometer is allowed to be longer than a time of multiple scanning of the ion mobility spectrometer, which means that a screening of the sample ions may be performed a plurality of times (for example, 6 or 7 times), and the screened sample ions are injected into the ion trap in a multi-accumulation manner. A mass spectrum signal intensity increases with an increase of an ion quantity. FIG. 11 shows an example of cumulative seven injections and one mass spectrum detection.

The ion mobility spectrometer 1 may be, for example, a positive and negative dual-mode ion mobility tube; for example, an integrated ceramic dual-mode mobility tube may be adopted. The ion mobility spectrometer 1 may also be a positive or negative single mode ion mobility tube. The ion mobility spectrometer has advantages of being portable, fast, sensitive, industrializable, etc., and may be widely used to measure a presence and dose of toxic and harmful gases and/or hazardous chemicals. If a composition of sample gas to be detected is complex, a chromatographic separation device may be pre-installed to achieve a triple separation detection. Areas other than the mass spectrometer and exhausted gas may be provided with a heating device according to detection needs, so as to prevent sample residues from being generated. According to actual needs, a solution of a dual mobility tube or dual mobility tube and dual mass analyzers may be used to achieve a simultaneous detection in positive and negative modes.

According to an exemplary embodiment of another aspect of the present disclosure, referring to FIG. 1, there is provided a method for detecting sample gas by using the gas analysis device 100 described above, including: inputting sample gas into the ion mobility spectrometer 1; controlling the gate valve 3 to open or close via the controller 4 to allow sample ions discharged from the suppression grid 14 of the ion mobility spectrometer 1 to flow into the mass spectrometer 2 through the through hole 151 of the Faraday plate 15 when the gate valve 3 is opened.

Specifically, the sample gas is transferred to the charge exchange region 181 at the sample input port 17, while the ion source 16 generates charged ions. The sample gas input from the sample input port 17 and the charged ions generated by the ion source 16 perform charge exchange in the charge exchange region 181, such that the sample gas is ionized to generate the sample ions. An electric field is formed between the isolation mesh 18 and the ion gate 12, and gaseous sample ions may freely diffuse from the charge exchange region 181 to the ion enrichment chamber 182, and the sample ions may be enriched or temporarily stored in the ion enrichment chamber 182. The plurality of electrodes 13 and the suppression grid 14 form an electric field gradient within the mobility tube 11 so as to move the charged sample ions from the ion enrichment chamber 182 to the mobility tube, and move within the mobility chamber 111 of the mobility tube 11 to the Faraday plate 15. By changing a potential difference between the electrodes 13 and the suppression grid 14, a migration speed of the sample ions in the mobility tube 11 may be changed.

In an exemplary embodiment, the controller 4 controls the voltages applied to the ion gate 12, the electrodes 13 and the suppression grid 14 so as to control the operating mode of the ion mobility spectrometer.

In an exemplary embodiment, referring to FIGS. 1 and 5, steps of the controller 4 controlling the voltages applied to the ion gate 12, the electrodes 13 and the suppression grid 14 of the ion mobility spectrometer 1 includes: controlling the ion gate 12 to be opened or closed alternately; controlling the voltages applied to the electrodes 13 and the suppression grid 14 such that the sample ions move from the ion gate 12 to the Faraday plate 15 through the suppression grid 14; and controlling the gate valve 13 to be closed, such that the gas analysis device operates in the ion mobility spectrum detection mode.

In an exemplary embodiment, referring to FIGS. 1 and 6, steps of the controller 4 controlling the voltages applied to the ion gate 12, the electrodes 13 and the suppression grid 14 of the ion mobility spectrometer 1 includes: controlling the ion gate 12 and the suppression grid 14 to be in a continuous open state and controlling the gate valve 3 to be opened, such that the sample ions move from the ion gate 12 into the mass spectrometer 2 through the through hole 151 of the Faraday plate 15, such that the gas analysis device may operate in the mass spectrum detection mode.

In an exemplary embodiment, referring to FIGS. 1 and 7, steps of the controller 4 controlling the voltages applied to the ion gate 12, the electrodes 13 and the suppression grid 14 of the ion mobility spectrometer 1 includes: controlling the ion gate 12 to be opened or closed alternately, and controlling the voltages applied to the electrodes 13 and the suppression grid 14 such that the sample ions move from the ion gate 12 to the Faraday plate 15 through the suppression grid 14; controlling the gate valve 3 to be opened or closed alternately to allow the sample ions to enter the mass spectrometer through the through hole of the Faraday plate after acquiring the signal from the Faraday plate, such that the gas analysis device operates in the first mixed detection mode including the ion mobility spectrum detection mode and the mass spectrum detection mode.

In an exemplary embodiment, referring to FIGS. 1 and 9, steps of the controller 4 controlling the voltages applied to the ion gate 12, the electrodes 13 and the suppression grid 14 of the ion mobility spectrometer 1 includes: controlling the ion gate 12 to be opened or closed alternately; controlling the voltages applied to the electrodes 13 and the suppression grid 14 such that the sample ions move from the ion gate 12 to the Faraday plate 15 through the suppression grid 14; controlling the gate valve 3 to be opened, and controlling the suppression grid 14 to be opened or closed alternately such that the suppression grid selectively releases a part of the sample ions from the ion gate, and allow the sample ions having passed the suppression grid to enter the mass spectrometer 2 through the through hole 151 of the Faraday plate 15, such that the gas analysis device operates in the second mixed detection mode including the ion mobility spectrum detection mode and the mass spectrum detection mode.

In an exemplary embodiment, referring to FIGS. 1 and 11, the controller 4 controls the ion gate 12 to be opened or closed alternately, controls the voltages applied to the electrodes 13 and the suppression grid 14 such that the sample ions move from the ion gate 12 to the Faraday plate 15 through the suppression grid 14, and controls the gate valve 3 to be opened, such that the sample ions enter the mass spectrometer through the through hole of the Faraday plate 15 at a plurality of ion selection timings, such that the gas analysis device operates in the mass spectrometer enrichment detection mode that may detect accumulated ions from a single sample. Since a sample ion injection time of a single ion trap of the mass spectrometer is allowed to be longer than a time of multiple scanning of the ion mobility spectrometer, which means that a screening of the sample ions may be performed a plurality of times (for example, six or seven times), and the screened sample ions are injected into the ion trap in a multi-accumulation manner. A mass spectrum signal intensity increases with an increase of an ion quantity. FIG. 11 shows an example of cumulative seven injections and one mass spectrum detection.

The gas analysis device and the method for detecting sample gas provided by the embodiments of the present disclosure described above may realize a portable combination of ion mobility shift and ion trap mass spectrometer, and a single detection mode or multiple mixed detection modes may be selected according to actual situations.

Those skilled in the art may understand that the embodiments described above are exemplary, and may be modified by those skilled in the art. The structures described in the various embodiments may be freely combined without conflicts in structure or principle.

The present disclosure is described in combination with the accompanying drawings. However, the embodiments disclosed in the accompanying drawings are intended to exemplify the preferred embodiments of the present disclosure, and are not intended to limit the scope of the present disclosure. Although some embodiments of the inventive concept of the present disclosure have been shown and described, those of ordinary skill in the art will appreciate that these embodiments may be changed without departing from the general principle and spirit of the present disclosure. The scope of the present disclosure is defined by the claims and their equivalents.

What is claimed is:

1. A gas analysis device, comprising:
   an ion mobility spectrometer comprising an ion mobility tube, an ion gate, a plurality of electrodes, a suppression grid, and a Faraday plate sequentially disposed in the ion mobility tube, wherein the Faraday plate is configured to receive sample ions discharged from the suppression grid, and the Faraday plate is provided with a through hole;
   a mass spectrometer;
   a gate valve disposed between the Faraday plate and an ion inlet of the mass spectrometer; and
   a controller configured to control an opening or closing of the gate valve to allow the sample ions discharged from the suppression grid to flow into the mass spectrometer through the through hole of the Faraday plate when the gate valve is opened;
   wherein the ion mobility spectrometer further comprises:
   an ion source configured to generate initially charged ions;
   a sample input port configured to deliver sample gas into the ion mobility tube; and
   an isolation mesh arranged between the ion source and the ion gate to form a charge exchange region between the ion source and the isolation mesh, and an ion enrichment chamber between the isolation mesh and the ion gate.

2. The gas analysis device according to claim 1, wherein the controller is further configured to control voltages applied to the ion gate, the electrodes and the suppression grid and an activation of the mass spectrometer to control an operating mode of the ion mobility spectrometer.

3. The gas analysis device according to claim 2, wherein the controller is configured to control the ion gate to be opened or closed alternately, and control the voltages applied to the electrodes and the suppression grid such that the sample ions move from the ion gate to the Faraday plate through the suppression grid, and control the gate valve to be closed, such that the gas analysis device operates in an ion mobility spectrum detection mode.

4. The gas analysis device according to claim 2, wherein the controller is configured to control the ion gate and the suppression grid in a continuous open state and control the gate valve to be opened such that the sample ions move from the ion gate into the mass spectrometer through the through hole of the Faraday plate, such that the gas analysis device operates in a mass spectrum detection mode.

5. The gas analysis device according to claim 2, wherein the controller is configured to control the ion gate to be opened or closed alternately, control the voltages applied to the electrodes and the suppression grid such that the sample ions move from the ion gate to the Faraday plate through the suppression grid, and control the gate valve to be opened or closed alternately to allow the sample ions to enter the mass spectrometer through the through hole of the Faraday plate after acquiring a signal from the Faraday plate, such that the gas analysis device operates in a first mixed detection mode comprising an ion mobility spectrum detection mode and a mass spectrum detection mode.

6. The gas analysis device according to claim 2, wherein the controller is configured to control the ion gate to be opened or closed alternately, control the voltages applied to the electrodes and the suppression grid such that the sample ions move from the ion gate to the Faraday plate through the suppression grid, and control the suppression grid to be opened or closed alternately such that the suppression grid selectively releases a part of the sample ions into the mass spectrometer through the Faraday plate while acquiring a signal from the Faraday plate, such that the gas analysis device operates in a second mixed detection mode comprising an ion mobility spectrum detection mode and a mass spectrum detection mode.

7. The gas analysis device according to claim 2, wherein the controller is configured to control the ion gate to be opened or closed alternately, control the voltages applied to the electrodes and the suppression grid such that sample ions move from the ion gate to the Faraday plate through the suppression grid, and control the gate valve to be opened such that the sample ions enter the mass spectrometer through the through hole of the Faraday plate at a plurality of ion selection timings, such that the gas analysis device operates in a mass spectrometer enrichment detection mode detecting accumulated ions from a single sample.

8. The gas analysis device according to claim 1, further comprising a signal acquisition device for obtaining a mobility spectrogram and a mass spectrogram according to the sample ions received by the Faraday plate and the sample ions entering the mass spectrometer.

9. The gas analysis device according to claim 1, wherein the ion mobility tube is provided with a migration gas inlet downstream of the suppression grid, and a migration gas outlet upstream of the ion gate.

10. The gas analysis device according to claim 1, wherein each of the ion gate and the suppression grid comprises a frame, and a metal mesh attached to the frame.

11. The gas analysis device according to claim 1, wherein the mass spectrometer comprises:
an ion convergence device configured to receive the sample ions from the Faraday plate;
a vacuum chamber provided with an ion trap configured to receive the sample ions from the ion convergence device and an ion detector configured to generate a mass spectrum from the ions collected in the ion trap; and
a vacuum device configured to evacuate the vacuum chamber, such that the sample ions move to the ion trap.

12. The gas analysis device according to claim 11, wherein the mass spectrometer further comprises:
a pre-vacuum chamber disposed between the ion convergence device and the vacuum chamber;
a transfer device disposed in the pre-vacuum chamber to transfer the sample ions in the ion convergence device into the ion trap; and
a pre-vacuum device configured to evacuate the pre-vacuum chamber, such that the sample ions move from the ion convergence device to the transfer device;
wherein the mass spectrometer further comprises a vacuum exhaust port configured to adjust an air pressure in the pre-vacuum chamber and the vacuum chamber.

13. A method for detecting sample gas using the gas analysis device according to claim 1, comprising:
inputting sample gas into the ion mobility spectrometer;
controlling the gate valve to be opened or closed to allow the sample ions discharged from the suppression grid of the ion mobility spectrometer to flow into the mass spectrometer through the through hole of the Faraday plate when the gate valve is opened.

14. The method according to claim 13, wherein voltages applied to the ion gate, the electrodes and the suppression grid of the ion mobility spectrometer are controlled to control an operating mode of the ion mobility spectrometer.

15. The method according to claim 14, wherein steps of controlling the voltages applied to the ion gate, the electrodes and the suppression grid of the ion mobility spectrometer comprises:
controlling the ion gate to be opened or closed alternately;
controlling the voltages applied to the electrodes and the suppression grid such that the sample ions move from the ion gate to the Faraday plate through the suppression grid; and
controlling the gate valve to be closed, such that the gas analysis device operates in an ion mobility spectrum detection mode.

16. The method according to claim 14, wherein steps of controlling the voltages applied to the ion gate, the electrodes and the suppression grid of the ion mobility spectrometer comprises:
controlling the ion gate and the suppression grid to be in a continuous open state;
controlling the gate valve to be opened, such that the sample ions move from the ion gate into the mass spectrometer through the through hole of the Faraday plate, such that the gas analysis device operates in a mass spectrum detection mode.

17. The method according to claim 14, wherein steps of controlling the voltages applied to the ion gate, the electrodes and the suppression grid of the ion mobility spectrometer comprises:
controlling the ion gate to be opened or closed alternately;
controlling the voltages applied to the electrodes and the suppression grid such that the sample ions move from the ion gate to the Faraday plate through the suppression grid; and
controlling the gate valve to be opened or closed alternately to allow the sample ions to enter the mass spectrometer through the through hole of the Faraday plate after acquiring a signal from the Faraday plate, such that the gas analysis device operates in a first mixed detection mode comprising an ion mobility spectrum detection mode and a mass spectrum detection mode.

18. The method according to claim 14, wherein steps of controlling the voltages applied to the ion gate, the electrodes and the suppression grid of the ion mobility spectrometer comprises:
controlling the ion gate to be opened or closed alternately;
controlling the voltages applied to the electrodes and the suppression grid such that the sample ions move from the ion gate to the Faraday plate through the suppression grid; and
controlling the suppression grid to be opened or closed alternately to allow the suppression grid to selectively release a part of the sample ions into the mass spectrometer through the Faraday plate while acquiring a signal from the Faraday plate, such that the gas analysis device operates in a second mixed detection mode comprising an ion mobility spectrum detection mode and a mass spectrum detection mode.

19. The method according to claim 14, wherein steps of controlling the voltages applied to the ion gate, the electrodes and the suppression grid of the ion mobility spectrometer comprises:
controlling the ion gate to be opened or closed alternately;
controlling the voltages applied to the electrodes and the suppression grid such that the sample ions move from the ion gate to the Faraday plate through the suppression grid; and
controlling the gate valve to be opened such that the sample ions enter the mass spectrometer through the Faraday plate at a plurality of ion selection timings, and the gas analysis device operates in a mass spectrometer enrichment detection mode detecting accumulated ions from a single sample.

* * * * *